Nov. 19, 1968 H. L. JOHNSON 3,411,521

HYDRAULICALLY STABILIZED DOUBLE-ACTING PILOT-OPERATED LOAD CHECK VALVES

Filed July 14, 1966 2 Sheets-Sheet 1

INVENTOR.
Howard L. Johnson

BY
Fryer, Tjensvold, Feix & Phillips
ATTORNEYS

Nov. 19, 1968 H. L. JOHNSON 3,411,521

HYDRAULICALLY STABILIZED DOUBLE-ACTING PILOT-OPERATED LOAD CHECK VALVES

Filed July 14, 1966 2 Sheets-Sheet 2

INVENTOR.
Howard L. Johnson

BY
Fryer, Tjensvold, Feix & Phillips
ATTORNEYS

United States Patent Office 3,411,521

Patented Nov. 19, 1968

3,411,521

HYDRAULICALLY STABILIZED DOUBLE-ACTING PILOT-OPERATED LOAD CHECK VALVES

Howard L. Johnson, Joliet, Ill., assignor to Caterpillar Tractor Co., Peoria, Ill., a corporation of California Filed July 14, 1966, Ser. No. 565,249
3 Claims. (Cl. 137—99)

This invention relates generally to double-acting, pilot-operated load check valve assemblies and more particularly to means in such assemblies which prevent their valve elements from "hunting" or shattering.

Those skilled in the art relating to heavy earth-moving equipment are well aware of the reliance the earth-moving equipment manufacturer continues to place on hydraulically actuated systems. Quite frequently an efficiently operating load check valve forms an indispensable component of an hydraulic system. Such valves may be required to perform any number of tasks, and it is required that they be stable in operation, and that they come to assume an open or closed position without erratic behavior.

The present invention is taught in the environment of an hydraulically actuated wheel lean control as described in my assignee's United States Patent No. 3,198,088. In such a control, when the wheels of the motor grader lean in either direction, it will be understood that the hydraulic pressure, to which the load check valves are subject, consists of pump pressure and pressure generated by the piston of the hydraulic jack. The piston of the jack is induced by the weight of the motor grader and possibly by other external forces to which the wheels may be subjected from time to time to pressurize the fluid on one or the other side of the cylinder of the hydraulic jack.

Accordingly, it is an object of the present invention to provide a double-acting load check valve, the displaceable valve element of which comes to a quiescent position in a direct and non-oscillatory manner so as to be free from chatter or "hunting."

It is another object of the present invention to provide a pilot-operated double-acting load check valve which is hydraulically stabilized by being displaceable in response, in part, to the difference between forward and rearward hydraulic fluid pressures.

It is still another object of the present invention to provide a pilot-operated double-acting load check valve which is urged, in part, to maintain its closed position by hydraulic fluid pressure developed behind the valve.

Further objects and advantages of the invention and the manner in which it is carried into practice are made apparent in the following specification wherein reference is made to the accompanying drawings.

Figure 1:
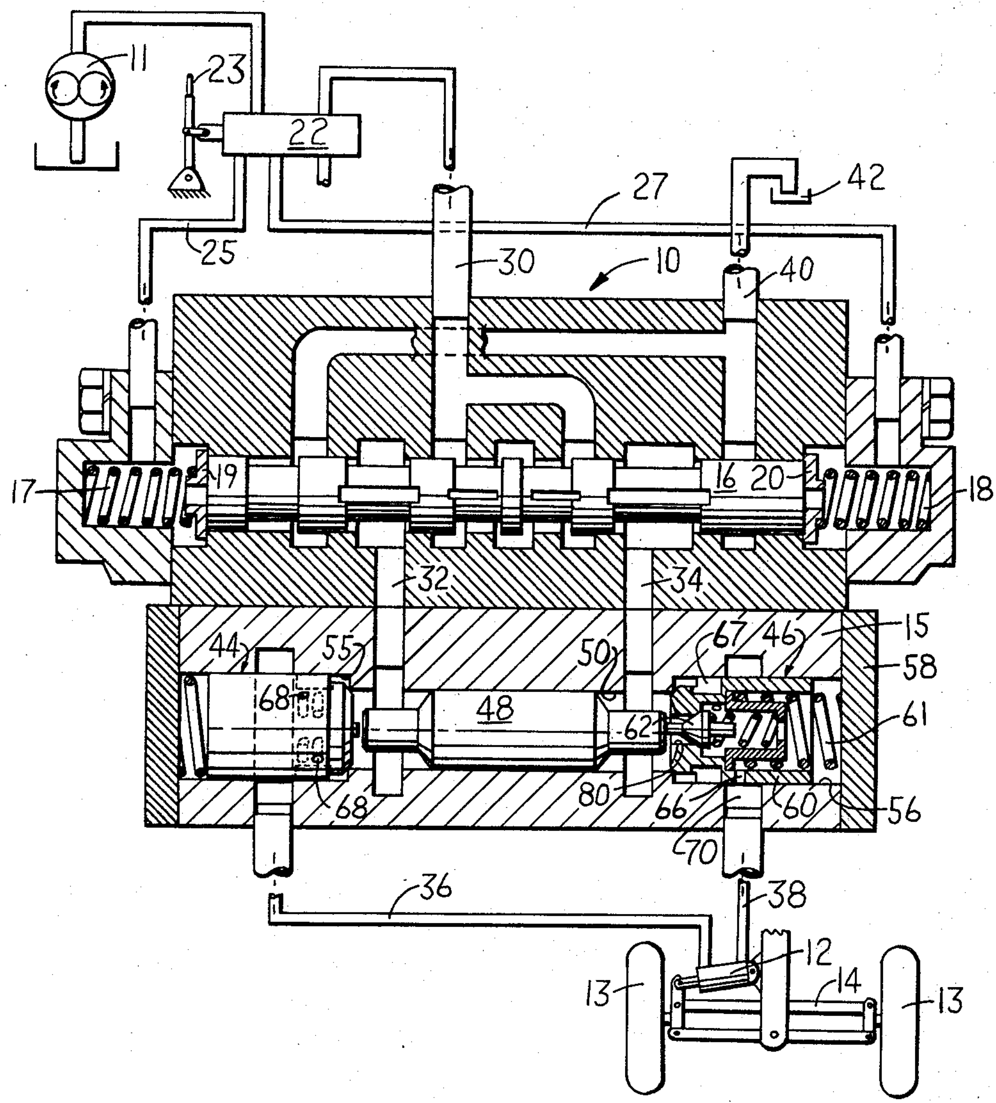
FIG. 1 is a view, being partly schematic, and showing two identical embodiments of the load check valve assemblies of the present invention, one in section and one in elevation, in the environment of a control valve for use in association with the fluid circuit of a wheel lean control of a motor grader.

In FIG. 1 of the drawings, a spool-type valve, generally indicated at 10, is illustrated as controlling or directing the flow of fluid under pressure from a pump 11 to either end of an hydraulic jack 12 employed for imparting leaning movement in a well-known manner to wheels 13 of a motor grader or the like through linkage, generally indicated at 14. Valve 10 has a sliding spool 16 normally held in a central or neutral position by springs 17 and 18 which bear against the opposite ends of the spool through washers 19 and 20, respectively, and which abut the end walls in the spring chambers so as to limit the movement of the spool in either direction.

Pressure from pump 11 is employed to move the valve spool in either direction through a power control valve 22 of conventional type which is adjustable through a lever 23 to direct pressure to the chamber of spring 17 through a line 25 or to the chamber of spring 18 through a line 27. This serves through the conventional configuration of the spool illustrated to direct fluid under pressure from an inlet line 30 selectively to passages 32 and 34 and to opposite ends of the jacks 12 through lines 36 and 38 which communicate with opposite ends of the jack. While pressure is directed to either end of the jack, the opposite end will be vented back through corresponding passage 32 or 34 and return line 40 to a sump 42 which is the same sump that supplies fluid to the intake of pump 11.

Interposed between passage 32 and line 36 leading to the rod end of the jack and between passage 34 and line 38 leading to the head end of the jack are identical check valve assemblies, generally indicated at 44 and 46. These check valve assemblies include valve elements of the poppet type which positively prevent return flow from either end of the jack as the result of forces acting upon the wheels 13. Fluid pressure is admitted to line 32 or to line 34 by actuation of the spool valve 10. This will open the corresponding check valve assembly by displacing the double ended piston 48 along bore 50 which extends between the two identical check valve assemblies so as to permit return flow from the opposite end of the jack.

Figure 2:
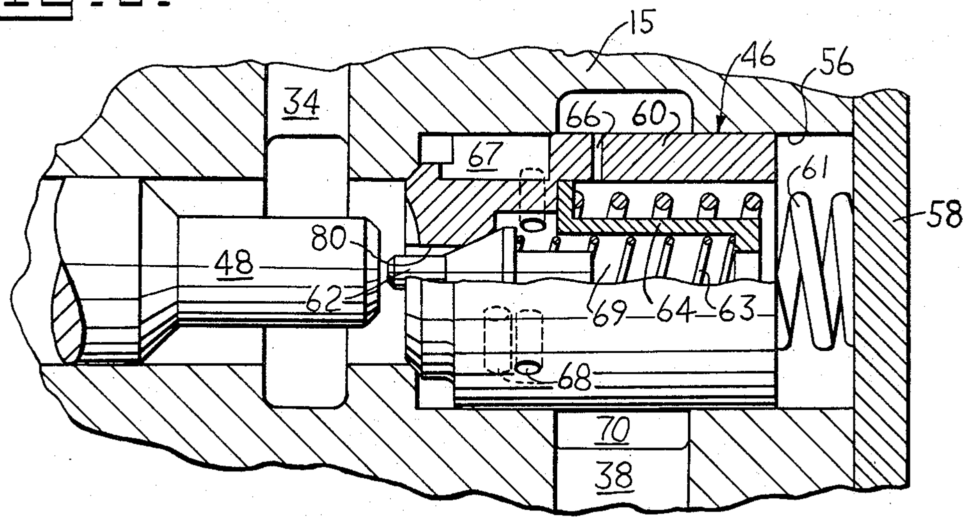
FIG. 2 is a fragmentary view, partly in section and partly in elevation, with parts broken away, of the same embodiment of the load check valve of the present invention.
Figure 3:
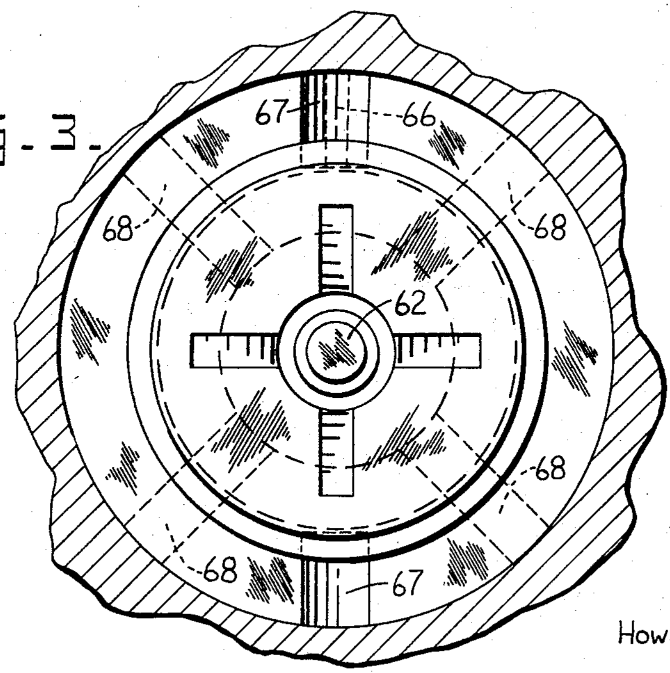
FIG. 3 is a fragmentary end view of the valve of FIG. 2.

The two identical load check valve assemblies, only one of which will be described in detail, are located in bores 55, 56 in the lower portion 15 of the spool type valve having side walls 57, 58. As best seen in FIG. 2, a valve element 6 of load check valve assembly 46 is reciprocably disposed in bore 56 and is urged to its closed position by spring 61. A small pressure breaker valve 62 controls an opening in the face of valve element 60 and is urged towards its closed position by a smaller spring 63 retained in a cage 64 within the valve element.

The valve element has a single radial orifice 66 and a pair of end mill metering slots 67. Staggered about the valve element are four ports 68 which open into an open-ended chamber 69 formed by cage 64. Ports 68 are blocked by the walls of bore 56 when the valve element is seated but will register with annulus 70 when valve element 60 is unseated.

Assuming that the wheels of the motor grader have been leaned from their erect position shown in FIG. 1 so that they slant to the right, the wheels will remain locked in this slanted position until lever 23 is again manipulated. The wheels are prevented from assuming an inclination different from their locked condition because the piston in the jack is fluid-locked, and can neither extend nor retract in the cylinder. Check valve assembly 46 prevents the fluid in the head end of the jack from escaping to line 34 which in turn prevents more fluid from entering the rod end. Since the wheels are assumed to be slanting to the right as viewed in FIG. 1, the piston will develop a pressure in line 38 due to the weight of the motor grader and possibly due to external forces directed to the wheels of the grader. This developed fluid pressure is communicated to the chamber of spring 61 via the single orifice 66. Consequently, it is seen that the valve element is urged to remain seated or closed not only by the force of spring 61 but also by this developed fluid pressure which acts on the rearward faces of the valve element.

Next, assume that the lever 23 is manipulated so as to cause the wheels to become slanted even further to the right. Hence, fluid pressure will be directed through line 25 to the chamber of spring 17. This will cause the spool 16 to move to the right and will allow pressurized fluid in line 30 to enter line 32 and contact both the front face of the check valve 44 and the left end of piston 48. In this first period of the transient stage, the pressurized fluid in line 32 will act to shift piston 48 to the right because of the relative sizes of the valve and the piston. Hence, double ended piston 48 is moved towards the right causing the pressure breaker valve 62 of valve assembly 46 to open. Since opening 80 in valve element 60 is larger than the single orifice 66, the back fluid pressure acting on the rear of the valve element tends to diminish. Next, or during the second period of this transient stage, the pressure in line 32 increases sufficiently to unseat check valve 44 and to admit more fluid to line 36. This causes the piston of the jack 12 to tend to extend further into the cylinder of the jack. During the next or third period the pressure in line 32 rises sufficiently to cause piston 48 to move even further toward the right overcoming the force of spring 61 and unseating check valve 46. This allows the fluid in line 38 to enter line 34 and the fluid is modulated by the metering slots 67. The wheels of the motor grader are thus urged to slant more towards the right.

During this third period, there is a possibility that check valve 46 will come to a fully open position because of the rapid increase in fluid pressure in line 32 and, therefore, will allow a relatively unrestricted communication between line 38 and line 34 to sump 42. Any excessive opening of check valve 46 will tend to excessively reduce the pressure in line 38 which normally resists the extension of the piston in the jack. Hence, any external force acting on the wheels, including the weight of the motor grader itself, will tend to cause the piston to overrun and to assume a position more advanced in the cylinder of the jack than would have been dictated by the pump pressure alone. If this overrunning were to occur this would cause the pressure in line 32 to become momentarily reduced; hence, check valve 46 would momentarily move towards a closed position. This would give the pressure in line 32 an opportunity to build up again and the cycle would repeat itself. Thus, it can be seen that during this third period of the transient stage, there is a possibility that check valve 46 will oscillate and "hunt" for an equilibrium position. Such hunting may become quite intolerable causing pressure fluctuations in the entire control and a general erratic behavior of the control.

To offset this danger, the present invention teaches the use of staggered ports 68 in the valve elements. As check valve 46 is being unseated by piston 48 during the third period of the transient stage, ports 68 are registering with the annulus 70. This registry permits fluid pressure to be admitted into open ended chamber 69 and this pressure assists the back pressure admitted via single orifice 66 and spring 61 in tending to resist the further opening of the check valve. Accordingly, the check valve comes directly to its quiescent open or operating point without either overrunning or underrunning its equilibrium position. Hence, the check valve is hydraulically stabilized since it moves directly from its closed or static position to a quiescent position without "hunting" for it.

I claim:

1. In a double-acting load check valve assembly for controlling flow between a first and a second passage, the combination comprising: a cylinder bore in a housing having an open end which registers with the opening of the first passage and an annular groove which registers with the second passage; a hollow main valve element having a first open end and a second open end wherein said second open end defines a central aperture, said main valve element being disposed for reciprocal movement in said bore; main valve biasing means urging said second open end of said main valve element toward the opening of the first passage; a pilot valve element disposed for reciprocal movement in the central aperture of the main valve element and operable, when urged against the central aperture, to close the second end of the main valve element whereby fluid is prevented from passing between the passages through the central aperture; pilot valve biasing means urging said pilot valve element against the central aperture; a first radial opening in a first wall portion of said main valve element at a location on the main valve element whereby said radial opening is in continuous registry with the annular groove of said cylinder bore; a plurality of second radial openings in a second wall portion of said main valve element intermediate said second open end and said first radial opening, said second radial openings being in registry with the annular groove only when said main valve element is separated from the opening of the first passage by a predetermined distance.

2. The combination as defined in claim 1 wherein said plurality of second radial openings comprises a plurality of axially separated openings whereby increasing separation between the main valve element and the opening of the first passage causes an increase in the number of second radial openings which register with the annular groove.

3. In a double-acting load check valve assembly operably responsive to a first force acting along a first passage and tending to open the valve and to a second force, consisting of hydraulic pressure, acting along a second passage and tending to close the valve, and having a main valve element which is disposed for reciprocal movement in a bore in the assembly housing and which is spring biased to oppose the first force, and also having a pilot valve element which is disposed for reciprocal movement inside the main valve element in association with an opening in the face of the main valve element and which is also spring biased to oppose the first force, the combination comprising: a first cylindrical wall portion of the main valve element containing a single radial opening in constant communication with the second passage through which a first hydraulic pressure force, forming one part of the second force is admitted and a second cylindrical wall portion of the main valve element containing a plurality of apertures in communication with the second passage when the main valve element is sufficiently opened to register with the second passage and through which a second hydraulic pressure force, forming the other part of the second force, is admitted.

References Cited

UNITED STATES PATENTS 3,198,088 8/1965 Johnson ------------- 91—420

WILLIAM F. O'DEA, *Primary Examiner.*

H. M. COHN, *Assistant Examiner.*